United States Patent
Lukic et al.

(10) Patent No.: US 10,564,033 B2
(45) Date of Patent: Feb. 18, 2020

(54) PROCEDURE FOR COMPARING A RECEPTION BEAM IMPINGING ON A LASER RECEIVER WITH A ROTATING LASER BEAM

(71) Applicant: Hilti Aktiengesellschaft, Schaan (LI)

(72) Inventors: Sasha Lukic, Buchs (AT); Andras Halasi, Feldkirch (AT); Ian Kearney, Feldkirch (AT); Ermin Calkic, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/313,321

(22) PCT Filed: Jun. 21, 2017

(86) PCT No.: PCT/EP2017/065156
§ 371 (c)(1),
(2) Date: Dec. 26, 2018

(87) PCT Pub. No.: WO2018/001802
PCT Pub. Date: Jan. 4, 2018

(65) Prior Publication Data
US 2019/0154501 A1   May 23, 2019

(30) Foreign Application Priority Data

Jun. 30, 2016 (EP) .................... 16177223

(51) Int. Cl.
*G01B 11/14* (2006.01)
*G01J 1/42* (2006.01)
*G01C 15/00* (2006.01)

(52) U.S. Cl.
CPC ............ *G01J 1/4257* (2013.01); *G01B 11/14* (2013.01); *G01C 15/004* (2013.01); *G01C 15/006* (2013.01)

(58) Field of Classification Search
CPC ..... G01J 1/4257; G01B 11/14; G01C 15/004; G01C 15/006
(Continued)

(56) References Cited

U.S. PATENT DOCUMENTS 5,946,087 A * 8/1999 Kasori ................. G01C 15/004
                                                356/139.1
7,119,316 B2  10/2006 Green et al.
(Continued)

FOREIGN PATENT DOCUMENTS

WO    WO 2009/154625 A1    12/2009

OTHER PUBLICATIONS

PCT/EP2017/065156, International Search Report (PCT/ISA/210) dated Sep. 5, 2017, with partial English translation, enclosing Written Opinion of the International Searching Authority (PCT/ISA/237) (Ten (10) pages).
(Continued)

*Primary Examiner* — Roy M Punnoose
(74) *Attorney, Agent, or Firm* — Crowell & Moring LLP

(57) ABSTRACT

A method for comparing a reception beam incident on a laser receiver with a rotating laser beam transmitted by a rotating laser in a direction of rotation, where the laser receiver includes an evaluation unit and a detection field having a first measuring range and a second measuring area, includes, when the reception beam is incident on the detection field, determining a first reception signal which represents a first time trend of the incident reception beam in the first measuring range and a second reception signal which represents a second time trend of the incident reception beam in the second measuring range. A direction of movement of the reception beam relative to the laser receiver from the first and the second reception signals is determined. The direction of the movement of the reception beam is compared by
(Continued)

the evaluation unit with the direction of rotation of the rotating laser beam.

12 Claims, 5 Drawing Sheets

(58) Field of Classification Search
USPC .......................................................... 356/614
See application file for complete search history.

(56) References Cited

U.S. PATENT DOCUMENTS

| | | |
|---|---|---|
| 7,224,473 B2 | 5/2007 | Zalusky |
| 7,838,808 B1 | 11/2010 | Ake |
| 2014/0283397 A1* | 9/2014 | Fessler .................. G01B 11/00 33/228 |
| 2017/0363421 A1* | 12/2017 | Kumagai ................ G01S 17/08 |

OTHER PUBLICATIONS

U.S. Patent Application, "Method for Comparing a Received Beam Incident on a Laser Receiver with a Rotating Laser Beam", filed Dec. 26, 2018, Inventor: Sasha Lukic et al.
U.S. Patent Application, "Method for Comparing a Received Beam Hitting a Laser Receiver with a Rotating Laser Beam", filed Dec. 26, 2018, Inventor: Sasha Lukic et al.

* cited by examiner

PROCEDURE FOR COMPARING A RECEPTION BEAM IMPINGING ON A LASER RECEIVER WITH A ROTATING LASER BEAM

CROSS REFERENCE TO RELATED APPLICATIONS

This application claims the priority of International Application No. PCT/EP2017/065156, filed Jun. 21, 2017, and European Patent Document No. 16177223.1, filed Jun. 30, 2016, the disclosures of which are expressly incorporated by reference herein.

BACKGROUND AND SUMMARY OF THE INVENTION

The present invention concerns a procedure for comparing a reception beam impinging on a laser receiver with a rotating laser beam and a device for performing such a procedure.

Rotating lasers are used internally and externally for leveling and marking tasks, such as the display of laser markings running horizontally, vertically or diagonally on a target area or the determination and review of horizontal height profile, vertical lines, vanishing lines and perpendicular points. Rotating lasers can be arranged in various device positions which are formed as a horizontal and vertical position. Here, rotating lasers which can be used horizontally and which are used exclusively in horizontal position are distinguished from rotating lasers that can be used horizontally and vertically which are used in horizontal and vertical position.

In the case of rotating lasers which may be used without protective measures, such as goggles, the maximum laser power is limited. The permitted maximum laser powers often lead, in the case of leveling and marking tasks externally, to laser beams which are not visible or only poorly visible. To improve the visibility of the laser beams, target systems or laser receivers are held into the laser beam. Laser receivers are held as a manual device directly in the laser beam by an operator or fastened to a telescopic or leveling arm. Known laser receivers include an evaluation unit and at least one detection field with a longitudinal and a transverse direction, whereby the laser receiver is aligned depending on the device position of the rotating laser in a longitudinal or transverse arrangement.

In the case of leveling and marking tasks, incorrect measurements can result from foreign beams of reflections from the rotating laser beam. Various procedures are known for comparing a reception beam hitting a laser receiver with the rotating laser beam. To reduce the risk of incorrect measurements with a laser receiver, it is known how to modulate the rotating laser beam of the rotating laser with a modulation signal. The reception beam impinging on the laser receiver is evaluated by the evaluation unit of the laser receiver and classified as a rotating laser beam if the reception beam was modulated with the modulation signal. What is disadvantageous is that a reflection from the rotating laser beam on a reflecting area is not detected by the evaluation unit. The reflected laser beam was modulated with a modulation signal and is classified by the evaluation unit of the laser receiver as a rotating laser beam.

U.S. Pat. No. 7,119,316 B2 reveals another known procedure for comparing a reception beam hitting a laser receiver with a rotating laser beam, which is emitted by a rotating laser. The laser receiver includes a detection field that is composed in a longitudinal direction of several photodetector arrays, whereby the photodetector arrays each include several photodetectors in a longitudinal direction. When a reception beam impinges on the detection field, a first and second reference signal is determined by the evaluation unit for each photodetector array, whereby the first and second reference signal represent the amplitudes of the outer photodetectors of the photodetector array which are covered by the reception beam. The reference signals are further processed by the evaluation unit through summation, differentiation and division, until a quotient results for the evaluation. This quotient is compared with a predefined limit value. If the quotient is less than the limit value, the reception beam is classified as a laser beam ("moving thin beam of laser light"). If the quotient is greater than the limit value, the reception beam is classified as a foreign beam ("omni-directional pulse of light").

From U.S. Pat. No. 7,224,473 B2, another procedure for comparing a reception beam impinging on a laser receiver with a rotating laser beam is known. The laser receiver includes a detection field which is composed of several photodetectors in a longitudinal direction, and an additional photodetector. When a reception beam impinges on the laser receiver, the evaluation unit determines a first, second and third reference signal, whereby the first reference signal represents the electrical output of a first outer photodetector which is covered by the reception beam, the second reference signal represents the electrical output of a second outer photodetector which is covered by the reception beam and the third reference signal represents the electrical output of the additional photodetector. Using the third reference signal, an evaluation of the reception beam takes place. If the amplitude of the third reference signal is sufficiently low, the reception beam is classified as a laser beam of the rotating laser. If the amplitude of the third reference signal is sufficiently high, on the other hand, the reception beam is classified as a foreign beam ("omni-directional pulse of light").

The procedures known from U.S. Pat. No. 7,119,316 B2 and U.S. Pat. No. 7,224,473 B2 for comparing a reception beam impinging on a laser receiver with a rotating laser beam from a rotating laser, have the disadvantage that a reflection from the rotating laser beam on a reflecting surface is not detected by the evaluation unit of the laser receiver and is incorrectly classified as a rotating laser beam. Through the reflection of the rotating laser beam on the reflecting surface, the amplitudes of the reference signals do not change or only change insignificantly, and have no influence on criteria for the evaluation of the reception beam.

The task of the present invention consists in the development of a procedure for comparing a reception beam hitting a laser receiver with a rotating laser beam, where the risk of incorrect measurements due to a reflection of the rotating laser beam on a reflecting surface is reduced. Furthermore, the procedure should be suited for a largely automatic execution.

The procedure for comparing a reception beam hitting a laser receiver with a rotating laser beam which is emitted by a rotating laser in a rotating direction around a rotational axis, whereby the laser receiver includes an evaluation unit and at least one detection field with a first measuring range and a second measuring range, exhibits the following steps according to the invention:

when the reception beam impinges on at least one detection field of the laser receiver, a reception signal is determined which realizes the time trend of the reception beam impinging in the first measuring range, and a second reception signal which realizes the time trend of the reception signal impinging in the second measuring range, a direction of movement of the reception beam relative to the laser receiver is determined from the first and second reception signal, and the direction of movement of the reception beam is compared by the evaluation unit with the rotational direction of the rotating laser beam.

In the invented procedure for comparing a reception beam with a rotating laser beam, at least one detection field exhibits a first and second measuring range and the evaluation unit of the laser receiver determines a first and second reception signal. The first reception signal represents the time trend of the reception beam hitting in the first measuring range and the second reception signal represents the time trend of the reception beam hitting in the second measuring range. A laser receiver, which exhibits at least one detection field with a first and second measuring range, makes it possible to detect a direction of movement of the reception beam relative to the laser receiver. As part of the invented procedure, the evaluation unit of the laser receiver determines a direction of movement of the reception beam relative to the laser receiver from the first and second reception signal and compares the direction of movement of the reception beam with the direction of rotation of the rotating laser beam.

Using the invented procedure, a reflection from the rotating laser beam on a reflection surface can be detected; foreign beams that do not rotate around an axis of rotation can be distinguished from the rotating laser beam. In the case of a non-rotating foreign beam, the time trend of the first reception signal and the time trend of the second reception signal essentially match and the evaluation unit cannot determine a direction of movement of the reception beam relative to the laser receiver from the first and second reception signal. By comparing the direction of movement of the reception beam and the direction of rotation of the rotating laser beam, a reflection from the rotating laser beam on a reflecting surface can be detected. The rotating laser moves the rotating laser beam in a known direction of rotation around the axis of rotation. When the rotating laser beam impinges on the laser receiver as a reception beam after a reflection on a reflecting surface, the direction of movement of the reception beam is opposed to the known direction of rotation of the rotating laser beam.

The other steps of the invented procedure depend on whether the evaluation unit can determine a direction of movement of the reception beam relative to the laser receiver from the first and second reception signal. Depending on the direction of movement of the reception beam, non-rotating foreign beams and reflected laser beams can be distinguished from the rotating laser beam using the invented procedure.

The reception beam is classified by the evaluation unit as a foreign beam, if the time trend of the first reception signal and the time trend of the second signal essentially match. Any beam is designated a foreign beam that is different from the rotating laser beam of the rotating laser. In the case of a non-rotating foreign beam, the time trend of the first reception signal and the time trend of the second reception signal essentially match, and the evaluation unit cannot determine a direction of movement of the reception beam relative to the laser receiver from the first and second reception signal.

If the time trend of the first reception signal is different from the time trend of the second reception signal, the direction of movement of the reception signal is determined by the evaluation unit. Here, the direction of movement of the reception beam is defined as the direction-to, if the first reception signal begins before the second reception signal and/or ends before the second reception signal, and the direction of movement of the reception signal is defined as the direction-back, if the second reception signal begins before the first reception signal and/or ends before the first reception signal.

The other steps of the invented procedure depend on whether the direction of movement of the reception signal and the direction of rotation of the rotating laser beam are in the same or the opposite direction. The invented procedure distinguishes two variants: in a first variant, the direction of movement of the reception beam and the direction of rotation of the rotating laser beam are in the same direction, and in a second variant, the direction of movement of the reception signal and the direction of rotation of the rotating laser beam are opposed.

When the direction of movement of the reception signal and the direction of rotation of the rotating laser beam are in the same direction, the reception beam is classified as a rotating laser beam by the evaluation unit. The rotating laser moves the rotating laser beam in a known direction of rotation around the axis of rotation. When the rotating laser beam impinges on the laser receiver as reception beam without a reflection on the reflecting surface, the direction of movement of the reception beam is in the same direction as the known direction of rotation of the rotating laser beam. In the invented procedure, the reception beam is always classified as rotating laser beam by the evaluation unit when the direction of movement and the direction of rotation are in the same direction.

The direction of movement of the reception beam is also in the same direction as the known direction of rotation in case of an even number of reflections of the rotating laser beam, so that reception beams that arise from an even number of reflections from the rotating laser beam are incorrectly classified as rotating laser beam by the evaluation unit. In the practical application of rotating lasers and laser receivers, the simple reflection of the rotating laser beam on a reflecting surface represents the most common cause of incorrect measurements, so that the invented procedure does reduce the risk of incorrect measurements, but cannot completely prevent incorrect measurements.

Particularly preferred, the laser receiver is switched by the evaluation unit into a measuring mode, whereby in the measuring mode, a position of the reception beam is determined in a longitudinal direction of at least one detection field. When an impinging reception beam is classified by the evaluation unit as rotating laser beam, the laser receiver can be used as intended. For this, the laser receiver can be switched by the evaluation unit into a measuring mode.

When the direction of movement of the reception beam and the direction of rotation of the rotating laser beam are in the opposite direction, the reception beam is classified by the evaluation unit as reflected laser beam. The rotating laser moves the rotating laser beam in a known direction of rotation around an axis of rotation. When the rotating laser beam impinges on the laser receiver as a reception beam after a reflection on a reflecting surface, the direction movement of the reception beam is opposed to the known direction of rotation of the rotating laser beam. In the invented procedure, the reception beam is always classified by the evaluation unit as reflected laser beam, when the direction of movement and the direction of rotation are in the same direction.

The direction of movement of the reception beam is also in the opposite direction of the known direction of rotation in the case of an odd number of reflections from the rotating laser beam, so that reception beams that arise from an odd number of reflections from the rotating laser beam can be correctly classified by the evaluation unit as reflected laser beam.

In the invented procedure, the rotating laser beam is moved in a known direction of rotation around an axis of rotation. The evaluation unit of the laser receiver determines a direction of movement of the laser beam and compares the direction of movement with the direction of rotation of the rotating laser. Here, it is to be observed that the direction of movement depends on the position of the laser receiver and the absolute direction of movement in opposing positions of the laser receiver are in the opposite direction. The position of the laser receiver to the rotating laser can be determined using the rotating laser beam.

In a preferred further development of the procedure, the rotating laser beam is moved by 360 degrees around the axis of rotation and the angle of 360 degrees is subdivided into a first and second angle range, whereby the rotating laser beam distinguishes itself in a beam property or in several beam properties. As part of the invented procedure, the evaluation unit of the laser receiver analyzes the impinging reception beam. Using the beam property in which the rotating laser distinguishes itself in the first and second angle range, the evaluation unit can determine the angle range in which at least one detection field of the laser receiver is hit by the reception beam.

Preferably, the rotating laser beam is modulated with a modulation signal, whereby in the first angle range, a first modulation signal is used and in the second angle range, a second modulation signal is used which is distinct from the first modulation signal. The first and second modulation signal can be different from one another with respect to amplitude, form and/or a modulation frequency. As part of the invented procedure, the evaluation unit of the laser receiver analyzes the impinging reception beam and can determine the modulation signal with which the reception beam was modulated. Using the modulation signal, the evaluation unit can determine the angle range in which at least one detection field of the laser receiver was hit by the reception beam.

According to the invention, a device is provided for the performance of a procedure with a rotating laser which emits a laser beam that rotates in a direction of rotation around an axis of rotation, and a laser receiver which includes an evaluation unit and at least one detection field with a first measuring range and a second measuring range. In a first variant, the rotating laser is aligned in a vertical position and the laser receiver is aligned in a transverse direction. Here, the axis of rotation of the rotating laser and the longitudinal direction of at least one detection field are aligned perpendicular to a direction of gravitation of the gravitational field, and the transverse direction of at least one detection field is aligned parallel to the direction of gravitation. In a second variant, the rotating laser is aligned in a horizontal position and the laser receiver in a longitudinal arrangement. Here, the axis of rotation of the rotating laser and the longitudinal direction of at least one detection field is aligned parallel to the direction of gravitation and the transverse direction of at least one detection field is aligned perpendicular to the direction of gravitation.

Preferably, the laser receiver includes a first detection field and a second detection field spaced at a distance from it, whereby the first detection field exhibits the first measuring range and the second detection field exhibits the second measuring range.

Particularly preferred, the laser receiver exhibits an inclination sensor which measures an inclination of the laser receiver relative to a direction of gravitation of the gravitational field. The inclination sensor can be used to clearly define the alignment of the laser receiver. In the embodiment of the invented procedure, the laser receiver is aligned in longitudinal or in transverse arrangement, whereby the longitudinal or transverse arrangement of the detection field should run parallel to and the transverse direction of the detection field should run perpendicular to the vertical. The longitudinal or transverse direction of the detection field and the direction of gravitation can be in the same direction or in opposed directions. Using the inclination sensor, both of the alignments can be distinguished from one another as "in the same direction" or "in the opposite direction".

Particularly preferred, the rotating laser and the laser receiver are able to be connected by way of a communication connection, whereby the communication occurs between the evaluation unit of the laser receiver and a control unit of the rotating laser. In the embodiment of the invented procedure, the evaluation unit of the laser receiver determines a direction of movement of the reception beam relative to the laser receiver from the first and second reception signal and compares the direction of movement of the reception beam with the direction of rotation of the rotating laser beam. The direction of rotation of the rotating laser beam can be transmitted by the rotating laser to the evaluation unit by way of the communication connection, such that the invented procedure can be performed automatically.

Embodiment examples of the invention are described in the following using the drawings. The drawings are not necessarily meant to represent the embodiment example to scale, rather the drawings, where helping to explain, are designed schematically and/or slightly distorted. Here, it is to be taken into account that various modifications and changes concerning the form and the details of an embodiment example can be performed, without deviating from the general idea of the invention. The general idea of the invention is not limited to the exact form or the details of the embodiment example shown and described or limited to an object that would be limited in comparison to the object claimed in the claims. In the given dimension ranges, values that also are within the named limits are revealed and can be used and claimed as desired.

For the sake of simplicity, the same reference signs are used in the following for identical or similar parts or parts with identical or similar function.

DETAILED DESCRIPTION OF THE DRAWINGS

Figure 1:
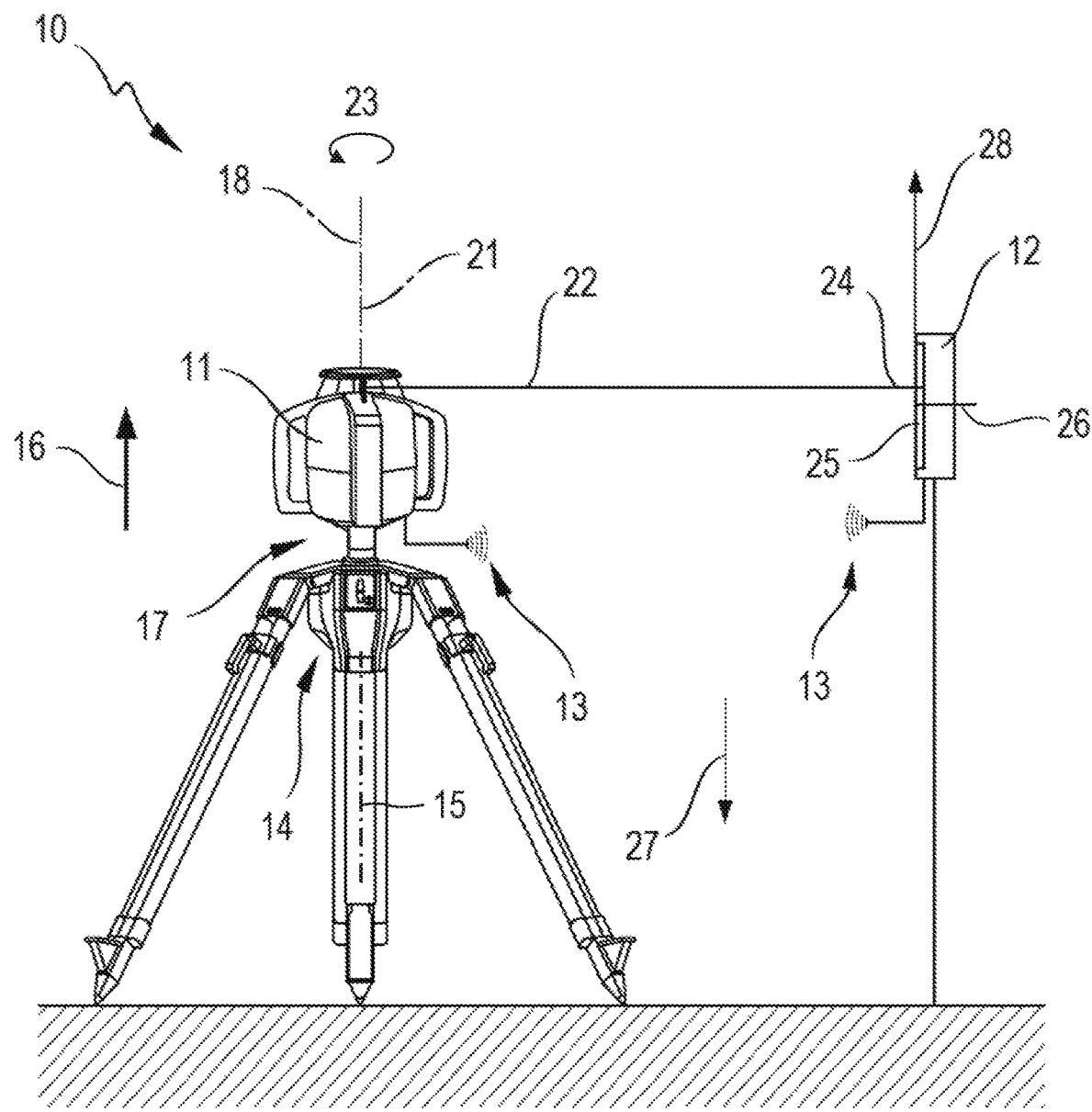
FIG. 1 shows a device with a rotating laser which emits a rotating laser beam, and a laser receiver.

FIG. 1 shows a device 10 with a rotating laser 11 and a laser receiver 12, which can be connected by way of a communication connection 13. The communication connection 13 is formed as a wireless communication connection or as a wired communication connection. The rotating laser 11 is arranged in a horizontal position, which is provided for horizontal applications of the rotating laser 11, and the laser receiver 12 is arranged in a longitudinal direction.

The rotating laser 11 is arranged on a motorized stand 14, which makes possible an automatic height adjustment of the rotating laser 11 along an axis 15 along a height axis 16 (double arrow). Additionally, a turning platform 17 can be provided for, which makes possible an automatic angle adjustment of the rotating laser 11 around a turning axis 18 of the turning platform 17. The turning platform 17 can be integrated into the stand 14 or the rotating laser 11, or formed as a separate component that is arranged on the stand 14. The rotating laser 11 is formed as a rotating laser that can be horizontally and vertically, and which emits a rotating laser beam 22 around an axis of rotation 21 of the rotating laser 11. The rotating laser beam 22 rotates in a direction of rotation 23 around the axis of rotation 21 and generates a laser level which is arranged perpendicular to the axis of rotation 21 of the rotating laser 11.

The laser receiver 12 is equipped with a height-measuring function which determines the impingement position of a reception beam 24 on a detection field 25 of the laser receiver 12 and represents the distance of the reception beam 24 to a zero position 26 of the detection field 25 as a height position. The alignment of the laser receiver 12 is defined using the detection field 25 and a direction of gravitation 27 of the gravitational field. The detection field 25 of the laser receiver 12 exhibits a detection height in a longitudinal direction 28 and a detection width in a transverse direction 29 (see FIGS. 2A, B). The longitudinal direction 28 corresponds to the measuring direction of the laser receiver 12 and the transverse direction 29 is perpendicular to the longitudinal direction 28. As longitudinal arrangement, the alignment of the laser receiver 12 is designated in which the longitudinal direction 28 of the detection field 25 is aligned parallel and the transverse direction 29 of the detection field 25 perpendicular to the direction of gravitation 27, and as transverse arrangement, the alignment of the laser receiver 12 is designated in which the longitudinal direction 28 of the detection field 25 is aligned perpendicular and the transverse direction 29 of the detection field 25 parallel to the direction of gravitation 27.

Figure 2A:
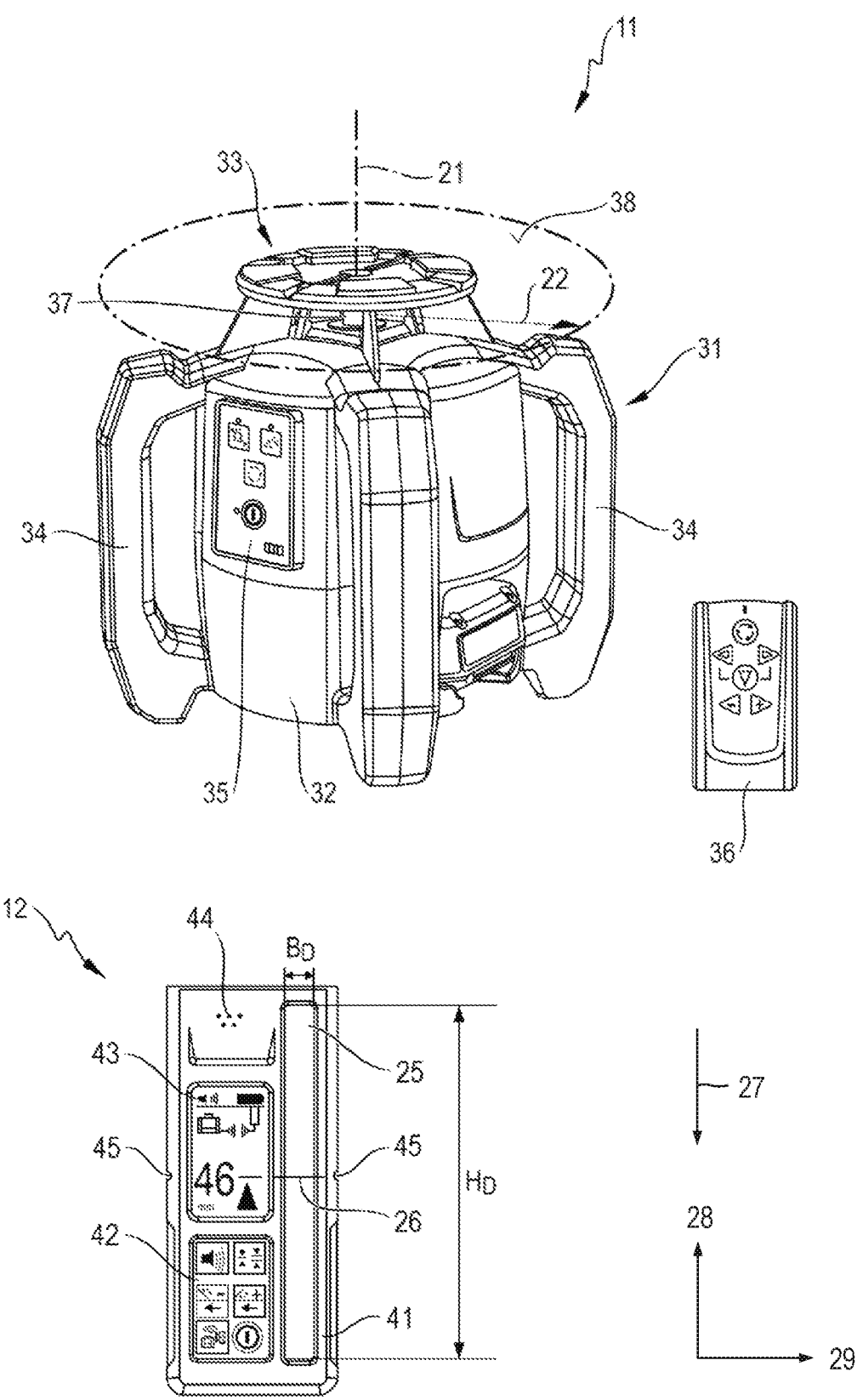
FIGS. 2A, B show the rotating laser and laser receiver in FIG. 1 in a first arrangement, in which the rotating laser is aligned in horizontal position and the laser receiver is aligned in a longitudinal arrangement (FIG. 2A), and in a second arrangement, in which the rotating laser is aligned in a vertical position and the laser receiver is aligned in a transverse direction (FIG. 2B)
Figure 2B:
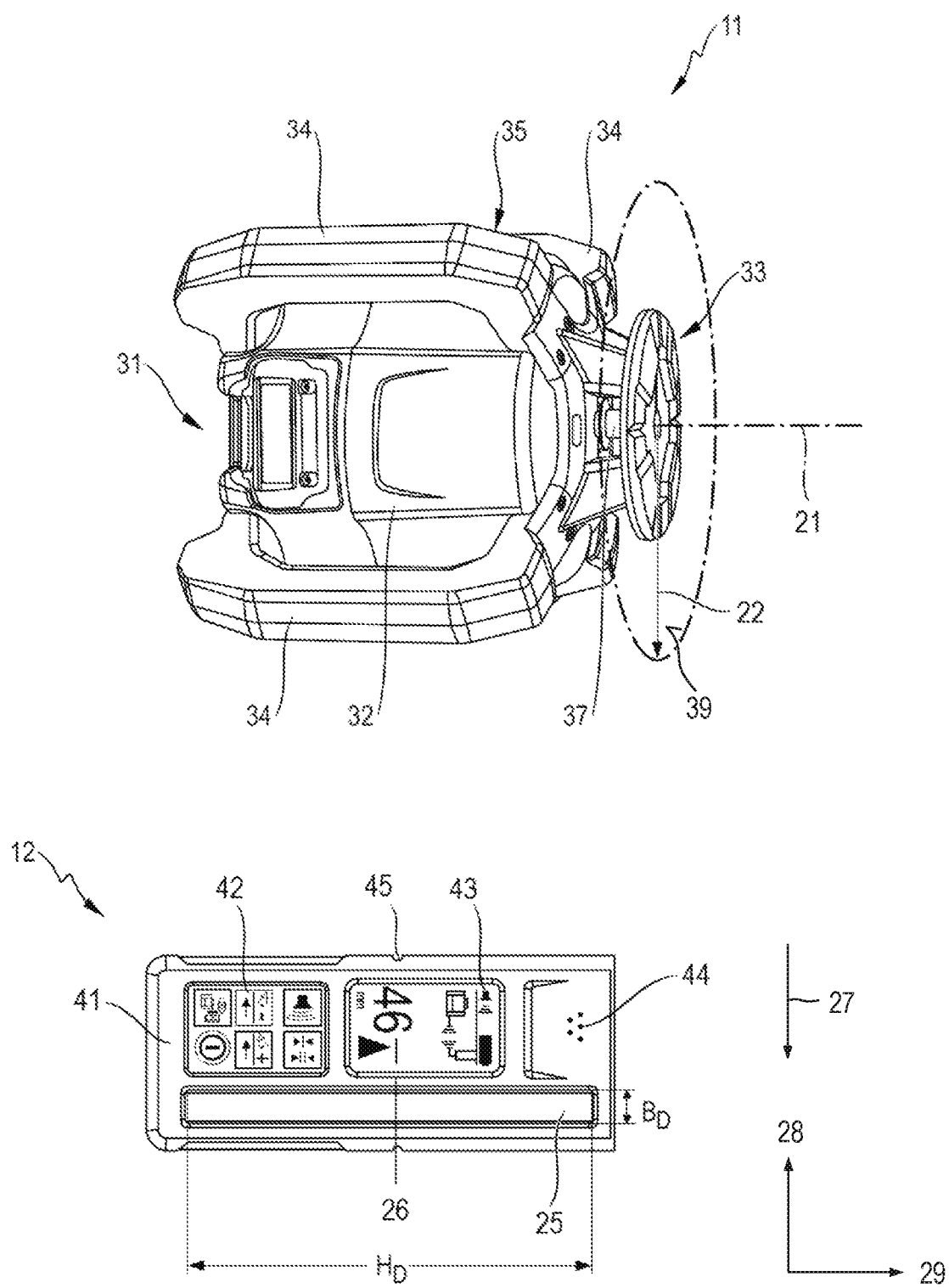

FIGS. 2A, B show the rotating laser 11 and the laser receiver 12 in FIG. 1 in a three-dimensional representation. Here, FIG. 2A shows the rotating laser 11 in a horizontal position and the laser receiver 12 in a longitudinal arrangement (FIG. 2A) and FIG. 2B shows the rotating laser 11 in a vertical position and the laser receiver 12 in a transverse arrangement.

The rotating laser 11 includes a device housing 31 and measuring equipment arranged in the device housing 31. The device housing 31 consists of a base housing 32, a rotating head 33 and several handles 34. The operation of the rotating laser 11 is performed by way of operating equipment 35 which is integrated into the basic housing and can be operated from outside. In addition to the operating equipment 35 that is integrated into the base housing 32, a remote control 36 can be provided for which can be connected with the rotating laser 11 by way of a communication connection. The measuring equipment of the rotating laser 11 generates a laser beam within the base housing 32, which impinges on an optical deflector 37 that rotates around an axis of rotation 18. The laser beam is deflected by the optical deflector 37 by 90° and forms the rotating laser beam 22 of the rotating 11, which spreads a laser plane. The rotating laser beam 22 generates a horizontal laser plane 38 in horizontal position of the rotating laser 11 and a vertical laser plane 39 in vertical position of the rotating laser 11.

The laser receiver 12 includes a receiving housing 41, operating equipment 42, an optical display 43, a speaker 44 and a detection field 25. The detection field 25 exhibits a detection height $H_D$ in the longitudinal direction 28 and a detection width $B_D$ in the transverse direction 29. The operating equipment 42, the optical display 43, the speaker 44 and the detection field 25 are integrated in the receiving housing 41 of the laser receiver 12. The operator can read information by way of the laser receiver 12 using the optical display 43. This includes, for example, a charge state of the laser receiver 12, information about the communication connection 13 to a rotating laser 11 and the set volume of the speaker 44. The distance of the reception beam 24 to the zero position 26 of the laser receiver 12 can also be displayed optically as a numeric value. Alternately, or in addition to the optical display 43, the distance of the reception beam 24 can be communicated by way of the speaker 44. The zero position 26 of the detection 25 is displayed on the receiver housing 41 by way of marking notches 45.

Figure 3:
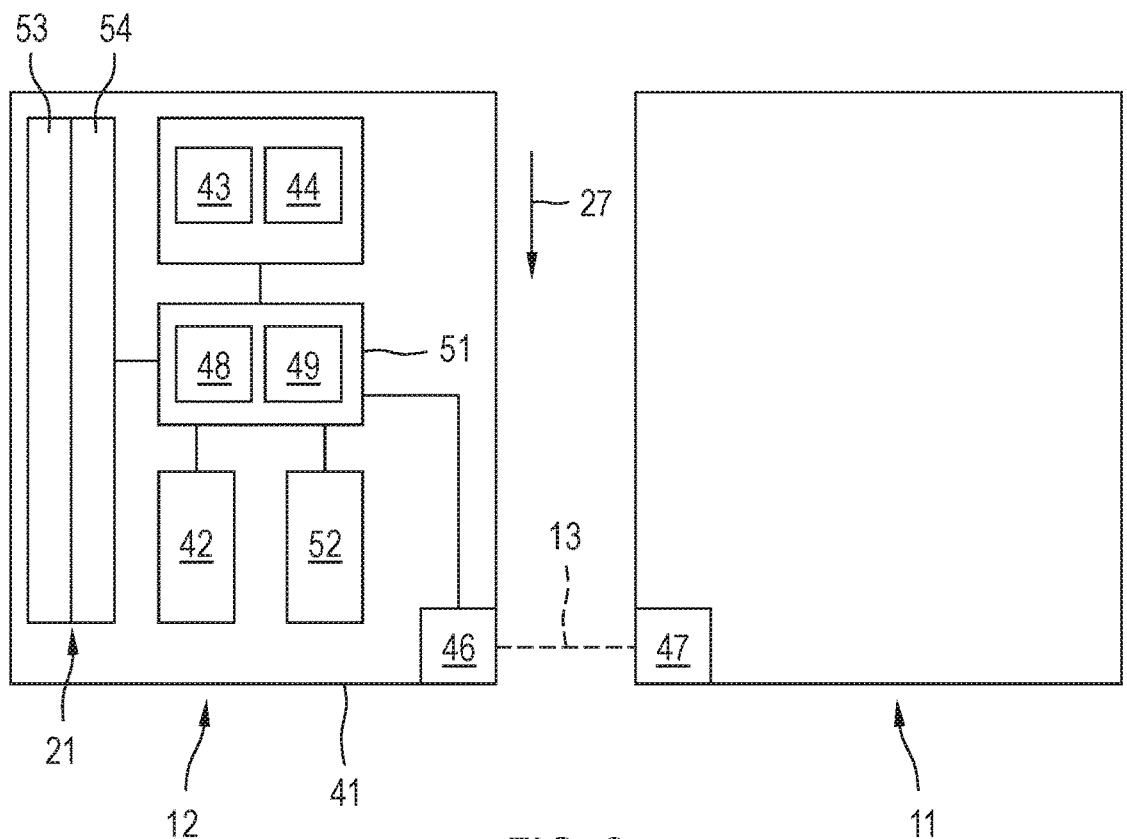
FIG. 3 shows the structure of the laser receiver in detail and the interaction of the [sic] with the rotating laser in the form of a block diagram.

FIG. 3 shows the structure of the laser receiver 12 in detail and the interaction of the laser receiver 12 with the rotating laser 11 in the form of a block diagram. The communication between the laser receiver 12 and the rotating laser 11 can be done by way of the communication connection 13, which connect a first transmission and receiving unit 46 in the laser receiver 12 with a second transmission and receiving unit 47 in the rotating laser 11. The first and second transmission and receiving unit 46, 47 are, for example, formed as radio modules, and the communication between the laser receiver 12 and the rotating laser 11 is done by way of a communication connection formed as a radio connection 13.

The detection field 25, the optical display 43 and the speaker 44 are connected with an evaluation unit 48, which is arranged within the receiver housing 41. The evaluation unit 48 is connected with a control unit 49 for controlling the laser receiver 12, whereby the evaluation unit 48 and the control unit 49 are integrated, for example, as a control unit 51 formed as a microchip controller. The laser receiver 12 can also include an inclination sensor 52 which is arranged within the receiver housing 41 and which is connected with the control unit 41. Using the inclination sensor 52, an inclination of the laser receiver 12 relative to the direction of gravitation 27 of the gravitational field can be measured. The inclination sensor 52 can include a 2-axis acceleration sensor or two single-axis accelerations sensors.

The detection field 25 exhibits a first measuring range 53 and a second measuring range 54 which are next to one another in the embodiment example. When the reception beam 24 impinges on the detection field 25 of the laser receiver 12, the evaluation unit 48 determines a first reception signal which represents the time trend of the impinging reception beam 24 in the first measuring range 53, and a second reception signal which represents the time trend of the impinging reception beam 24 in the second measuring range 54. The evaluation unit 48 determines a direction of movement of the reception beam 24 relative to the laser receiver 12 from the first and second reception signals and compares the direction of movement of the reception beam 24 with the direction of rotation 23 of the rotating laser beam 22. The direction of rotation 23 of the rotating laser beam 22 is transmitted by the rotating laser 11 by way of the communication connection 13 to the evaluation unit 48 of the laser receiver 12 or entered by the operator by way of the operating equipment 42.

Figure 4:
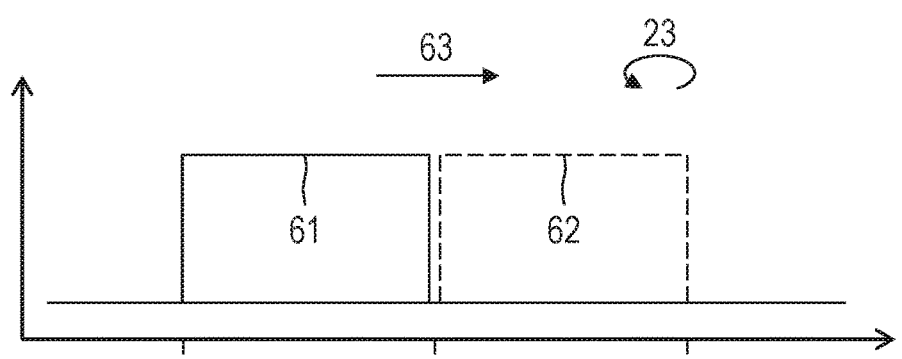
FIG. 4 shows a first and second reception signal which are generated by the rotating laser beam of the rotating laser when impinging on a first and second measuring range of the laser receiver.

FIG. 4 shows a first and second reception signal 61, 62, which are created by the rotating laser beam 22 of the rotating laser 11 upon impingement on the first and second measuring range 53, 54 of the laser receiver 12. The first reception signal 61 represents the time trend of the impinging rotating laser beam in the first measuring range 53 and the second reception signal 62 represents the time trend of the impinging rotating laser beam in the second measuring range 54. The first reception signal 61 begins before the second reception signal 62 with respect to time, and ends before the second reception signal 62 with respect to time.

The evaluation unit 48 determines a direction of movement 63 of the reception beam 24 relative to the laser receiver 12 from the cycle of the first and second reception signals 61, 62 and compares the direction of movement 63 with the direction of rotation 23 of the rotating laser beam. The direction of movement 63 of the reception beam 24 and the direction of rotation 23 of the rotating laser beam 22 are in the same direction. The reception beam 24 is classified by the evaluation unit 48 as a rotating laser beam and the laser receiver 12 is switched by the evaluation unit into a measuring mode. In the measuring mode of the laser receiver 12, the position of the rotating laser beam 22 can be determined in the longitudinal direction 28 of the detection field 25 or a height adjustment of the rotating laser beam 22 can take place.

Figure 5:
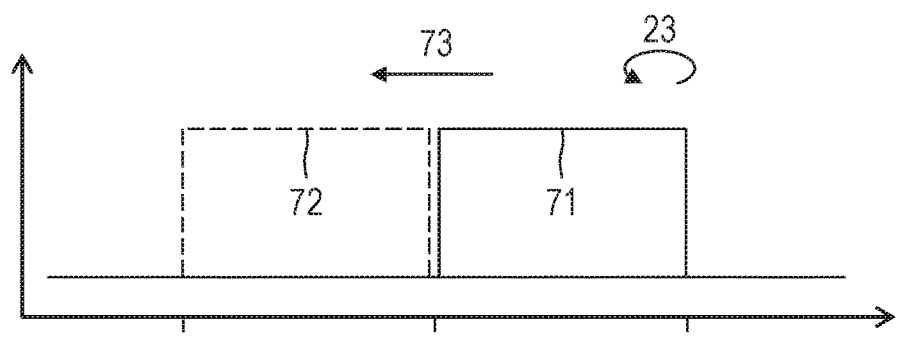
FIG. 5 shows a first and second reception signal which are generated by the rotating laser beam of the rotating laser after a reflection on a reflecting surface when impinging on the first and second measuring range of the laser receiver.

FIG. 5 shows a first and second reception signal 71, 72, which are generated by the rotating laser beam 22 after a reflection on the reflecting surface upon impingement on the first and second measuring range 53, 54 of the laser receiver 12. The first reception signal 71 represents the time trend of the reflected laser beam in the first measuring range 53 and the second reception signal 72 represents the time trend of the reflected laser beam in the second measuring range 54. The second reception signal 72 begins before the first reception signal 71 with respect to time and ends before the first reception signal 71 with respect to time.

The evaluation unit 48 determines a direction of movement 73 of the reception 24 relative to the laser receiver 12 from the first and second reception signals 71, 72 and compares the direction of movement 73 with a direction of rotation 23 of the rotating laser beam 22. The direction of movement 73 of the reception beam 24 and the direction of rotation 23 of the rotating laser beam 22 are in the opposite direction and the reception beam 24 is classified by the evaluation unit 48 as a reflected laser beam.

Figure 6:
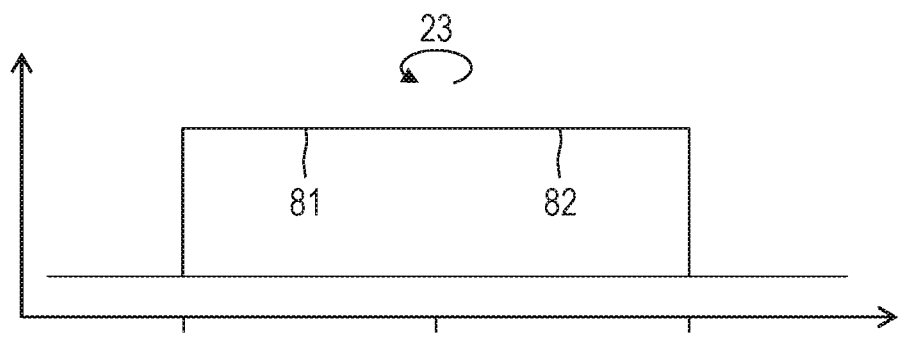
FIG. 6 shows a first and second reception signal which are generated by a reception beam formed as a foreign beam when impinging on the first and second measuring range of the laser receiver.

FIG. 6 shows a first and second reception signal 81, 82, which a reception beam formed as a foreign beam generates upon impingement on the first and second measuring range 53, 54 of the laser receiver 12. The first reception signal 81 represents the time trend of the foreign beam in the first measuring range 53 and the second reception signal 82 represents the time trend of the foreign beam in the second measuring range 54. The time trend of the first and second reception signals 81, 82 essentially match. The first and second reception signals 81, 82 begin at the same time with respect to time and end at the same time with respect to time.

The evaluation unit 48 attempts to determine a direction of movement of the reception 24 relative to the laser receiver 12 from the cycle of the first and second reception signals 81, 82. Since the time trend of the first reception signal 81 and the time trend of the second reception signal 82 match, the evaluation unit 48 cannot determine a direction of movement of the reception beam 24, and the reception beam 24 is classified by the evaluation unit 48 as a foreign beam.

Figure 7:
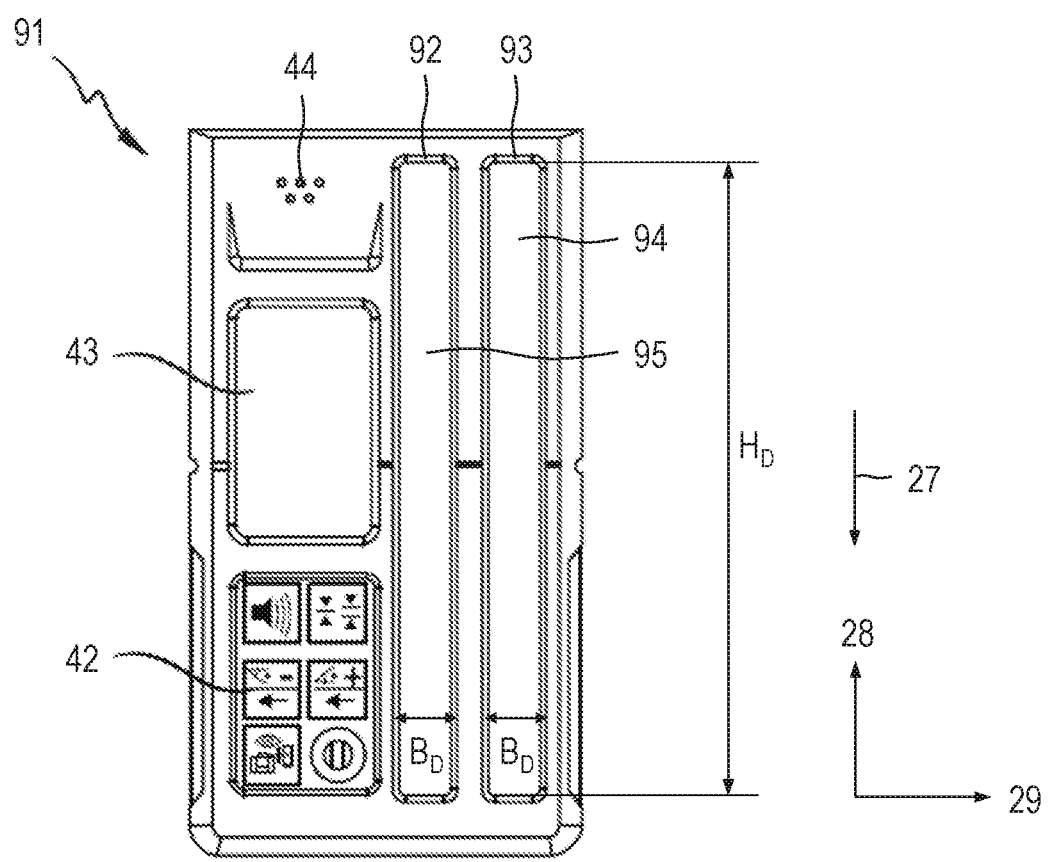
FIG. 7 shows an alternative embodiment of a laser receiver with a first detection field and a second detection field.

FIG. 7 shows an alternative embodiment of a laser receiver 91 with a first detection field 92 and a second detection field 93 at a distance from it. Here, the first detection field 92 exhibits a first measuring range 94 and the second detection field 93 exhibits a second measuring range 95. The laser receiver 91 can replace the laser receiver 12 in the device 10 of FIG. 1. The laser receiver 12, 91 are distinct from one another in the number of detection fields. In the case of the laser receiver 12 of FIG. 1, the first and second measuring ranges 53, 54 are integrated into a detection field, whereas with the laser receiver 91 in FIG. 7, the first measuring range 94 is arranged in the first detection field 92 and the second measuring range 95 is arranged in the second detection field 93.

The laser receivers 12, 91 are built analogously except for the detection fields and include, in addition to the detection fields, the receiver housing 41, the operating equipment 42, the optical display 43 and the speaker 44. The detection fields 92, 93 exhibit the detection height $H_D$ in the longitudinal direction 28 and the detection height $B_D$ in the transverse direction 29. The operating equipment 42, the optical display 43, the speaker 44 and the detection fields 92, 93 are integrated into the receiver housing 41 of the laser receiver 91.

Upon impingement of the reception beam 24 on the first or second detection fields 92, 93 of the laser receiver 91, the evaluation unit 48 determines a first reception signal which represents the time trend of the impinging reception beam 24 in the first measuring range 94, and a second reception signal which represents the time trend of the impinging reception beam 24 in the second measuring range 95. The evaluation unit 48 determines a direction of movement of the reception beam 24 relative to the laser receiver 12 from the first and second reception signals and compares the direction of movement of the reception signal 24 with the direction of rotation 23 of the rotating laser beams 22.

In the embodiment of the invented procedure, the rotating laser beam 22 is moved in a known direction of rotation 23 around an axis of rotation 21. The evaluation unit 48 of the laser receiver 12 determines a direction of movement of the laser beam 22 and compares the direction of movement with the direction of rotation 23 of the rotating laser 11. Here, it is to be observed that the direction of movement depends on the position of the laser receiver 12 and the absolute direction of movement in opposite positions of the laser receiver 12 is opposed to one another. The position of the laser receiver 12 to the rotating laser 11 can be determined using the rotating laser beam 22.

The rotating laser 11 starts its rotation around the axis of rotation 21 at an angle of rotation that is designated zero angle. Starting from the zero angle, a positive angle range between 0° and +180° and a negative angle range between 0° and −180° can be defined. The rotating laser beam 22 is moved by 360° around the axis of rotation 21 and the angle of 360° is subdivided into a first and second angle range, for example, the positive angle range between 0° and +180° can be defined as the first angle range and the negative angle range between 0° and −180° can be defined as the second angle range. To distinguish the first and second angle ranges, the rotating laser beam 22 exhibits at least one different beam property in the first and second angle ranges. Using the beam property in which the rotating laser beam 22 is distinct in the first a second angle range, the evaluation unit 48 of the laser receiver 12 can determine the angle range in which the detection field 25 of the laser receiver 12 was impinged on by the reception beam 24.

A modulation signal, for example, is suitable as a beam property that can be used to distinguish the first and second angle range. Here, a first modulation signal is used in the first angle range and a second modulation signal is used in the second angle range, which is different from the first modulation signal. The first and second modulation signal can be distinct from one another in their amplitude, form and/or modulation frequency. As part of the invented procedure, the evaluation unit 48 of the laser receiver 12 analyzes the impinging reception beam 24 and determines the modulation signal with which the reception signal 24 was modulated. Using the modulation signal, the evaluation unit 48 can determine the angle range in which the detection field 25 of the laser receiver 12 was impinged on by the reception beam 24.

The invention claimed is:

1. A method for comparing a reception beam incident on a laser receiver with a rotating laser beam, which is emitted by a rotating laser, in a direction of rotation around an axis of rotation, wherein the laser receiver includes an evaluation unit and a detection field with a first measuring range and a second measuring range, comprising the steps of:
   determining, upon incidence of the reception beam on the detection field of the laser receiver, a first reception signal which represents a first time trend of the incident reception beam in the first measuring range by the evaluation unit, and a second reception signal which represents a second time trend of the incident reception beam in the second measuring range by the evaluation unit;
   determining a direction of movement of the reception beam relative to the laser receiver from the first and the second reception signals by the evaluation unit; and
   comparing the direction of movement of the reception beam by the evaluation unit with the direction of rotation of the rotating laser beam.

2. The method according to claim 1 further comprising the step of classifying the reception beam as a foreign beam by the evaluation unit if the first time trend and the second time trend essentially match.

3. The method according to claim 1, wherein the direction of movement of the reception beam is determined by the evaluation unit if the first time trend is different from the second time trend.

4. The method according to claim 3 further comprising the step of classifying the reception beam by the evaluation unit as a reflected laser beam if the direction of movement of the reception beam and the direction of rotation of the rotating laser beam are opposite one another.

5. The method according to claim 1 further comprising the step of classifying the reception beam by the evaluation unit as a rotating laser beam if the direction of movement of the reception beam and the direction of rotation of the rotating laser beam are in a same direction.

6. The method according to claim 5 further comprising the step of switching the laser receiver by the evaluation unit into a measuring mode, wherein a position of the reception beam is determined in a longitudinal direction of the detection field.

7. The method according to claim 1 further comprising the step of moving the rotating laser beam by an angle of 360° around the axis of rotation and wherein the angle of 360° is subdivided into a first angle range and a second angle range, wherein the rotating laser beam is different in the first and the second angle ranges in one beam property or in a plurality of beam properties.

8. The method according to claim 7 further comprising the step of modulating the rotating laser beam with a modulation signal, wherein a first modulation signal is used in the first angle range and a second modulation signal is used in the second angle range and wherein the first modulation signal is different from the second modulation signal.

9. A device, comprising:
   a rotating laser which emits a laser beam rotating in a direction of rotation around an axis of rotation; and
   a laser receiver which includes an evaluation unit and a detection field with a first measuring range and a second measuring range;
   wherein the device performs the method according to claim 1.

10. The device according to claim 9, wherein the laser receiver includes a first detection field and a second detection field separated by a distance, wherein the first detection field includes the first measuring range and the second detection field includes the second measuring range.

11. The device according to claim 9, wherein the laser receiver includes an inclination sensor which measures an inclination of the laser receiver relative to a direction of gravitation of the gravitational field.

12. The device according to claim 9, wherein the rotating laser and the laser receiver are connectable via a communication connection and wherein a communication between the evaluation unit of the laser receiver and a control unit of the rotating laser takes place.

* * * * *